United States Patent
Morton et al.

(10) Patent No.: US 7,013,436 B1
(45) Date of Patent: Mar. 14, 2006

(54) ANALOG CIRCUIT POWER DISTRIBUTION CIRCUITS AND DESIGN METHODOLOGIES FOR PRODUCING SAME

(75) Inventors: Paul B. Morton, Newark, CA (US); Sunderarajan Mohan, Menlo Park, CA (US); Dan Bui, Sunnyvale, CA (US)

(73) Assignee: Barcelona Design, Inc., Sunnyvale, CA (US)

( * ) Notice: Subject to any disclaimer, the term of this patent is extended or adjusted under 35 U.S.C. 154(b) by 235 days.

(21) Appl. No.: 10/444,602

(22) Filed: May 25, 2003

(51) Int. Cl.
  *G06F 17/50* (2006.01)
  *H01L 29/00* (2006.01)
(52) U.S. Cl. .............................. 716/1; 257/532; 716/10
(58) Field of Classification Search ................... 716/1, 716/8–16
  See application file for complete search history.

(56) References Cited

U.S. PATENT DOCUMENTS 6,480,989 B1 * 11/2002 Chan et al. ..................... 716/8
6,732,335 B1 * 5/2004 Takabayashi et al. .......... 716/1
2003/0167452 A1 * 9/2003 Sekido ........................... 716/8

OTHER PUBLICATIONS

Roberto Aparichio, "Capacity Limits and Matching Properties Of Integrated Capacitors" IEEE Journal of Solid-State Circuits, vol. 37, No. 3, Mar. 2002, pp. 384-393.

* cited by examiner

*Primary Examiner*—Leigh M. Garbowski
(74) *Attorney, Agent, or Firm*—Blakely, Sokoloff, Taylor & Zafman, LLP

(57) ABSTRACT

A power distribution circuit built with wiring layers that reside above an analog circuit is described. The power distribution circuit comprises one or more capacitive structures that reside above the analog circuit. At least one of the one or more capacitive structures has electrodes that provide supply and/or reference voltages and their corresponding currents to said analog circuit. A machine readable medium is described to perform a method in order to design the power distribution circuit. The method includes: assigning a specific supply or reference voltage to each of the electrodes; and, determining wiring dimensions for each of the electrodes. The wiring dimensions for the electrodes of at least one of the capacitive structures is are based at least in part on IR drop concerns.

6 Claims, 11 Drawing Sheets

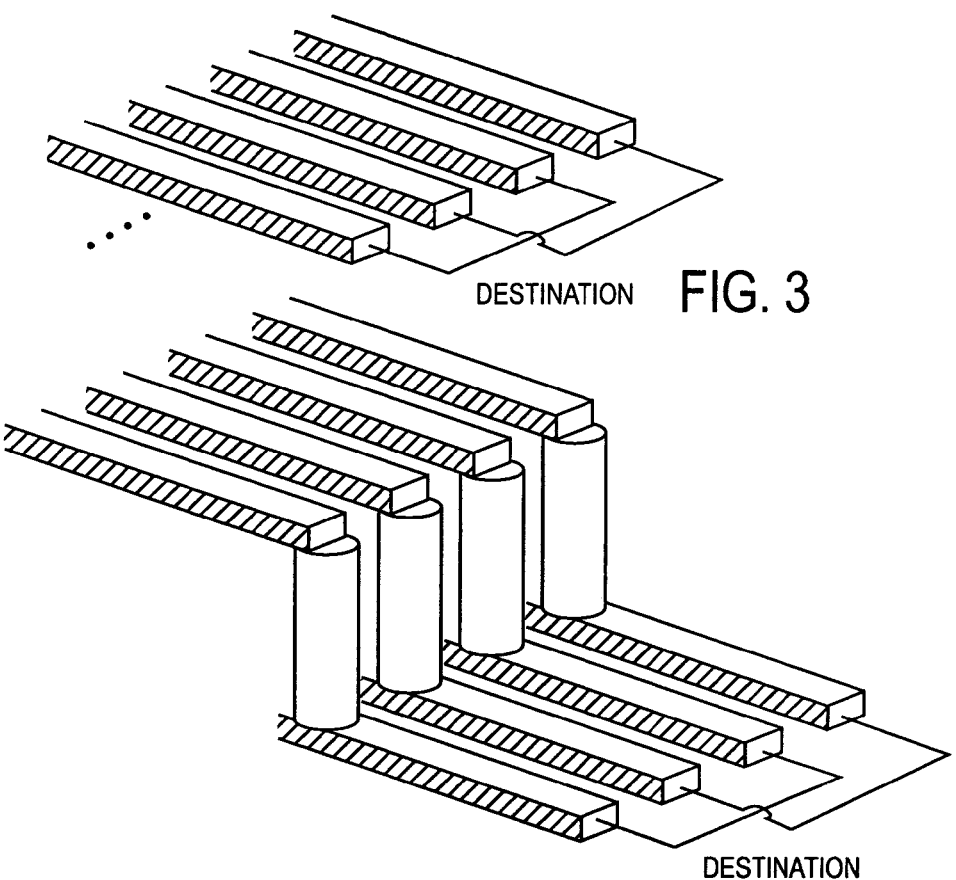
FIG. 3
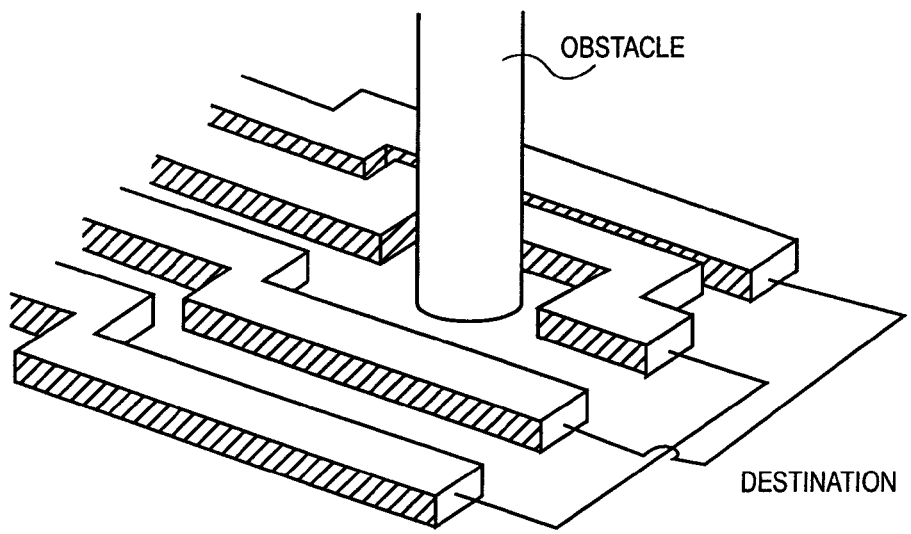

ELECTRODE A    ELECTRODE B

ELECTRODE A

ELECTRODE B

ANALOG CIRCUIT POWER DISTRIBUTION CIRCUITS AND DESIGN METHODOLOGIES FOR PRODUCING SAME

FIELD OF INVENTION

The field of invention relates to circuit design generally; and, more specifically, to analog circuit power distribution circuits and design methodologies for producing same.

BACKGROUND

Semiconductor integrated circuits (ICs) are typically fabricated by implanting transistors into the surface of a semiconductor (e.g., Silicon (Si)) and interconnecting the transistors as is appropriate (e.g., as dictated by a circuit design) with metal signal lines that are routed above the semiconductor surface. Semiconductor processes that manufacture digital ICs emphasize the ability to tightly pack as many transistors as is feasible upon a large semiconductor surface. Current day digital IC manufacturing processes can integrate as many as forty million transistors onto a single thumbnail or larger sized "chip" of semiconductor material.

Because, for digital ICs, an immense number of transistors can be integrated onto a wide semiconductor surface—and because transistors located far away from each other on the semiconductor surface often need to be connected—the circuit of metal lines or wires (also referred to as "wiring") that are routed above the semiconductor surface in order to properly interconnect the transistors is extremely complex. The complexity is handled, at least in part, through the manufacture of multiple layers of metal wires above the semiconductor surface. For example, current manufacturing processes can employ as many as eight planar levels above the semiconductor surface where metal wires may be located for the purposes of connecting at least a pair of transistors.

Because of the economic benefits of integration, a great deal of attention has been placed on the ability to place analog circuitry onto the same semiconductor chip with digital circuitry. Analog circuitry tends to be more sensitive to noise than digital circuits. As a consequence, in the design and fabrication of both "mixed signal" ICs (where considerable portions of both analog and digital circuitry reside on the same semiconductor chip) or "largely digital" ICs (where a large, comprehensive digital IC includes one or more region(s) of analog circuitry), attempts are made to deliberately partition the analog circuitry from the digital circuitry on the semiconductor surface. Here, the incessant "switching" activity of digital circuitry can create noise (e.g., through supply, reference, ground or even signal lines) that—if able to reach the analog circuit in sufficient strength—could cause the analog circuit to inadequately perform its corresponding function.

By separately partitioning the analog circuitry from the digital circuitry on the semiconductor surface, a degree of isolation is achieved that thwarts the propagation of digitally induced noise into the noise sensitive analog circuitry. Thus, it is not uncommon when observing the layout of an IC having both digital and analog circuit functions to find "islands" of an analog circuitry. Often, analog circuitry is placed at an edge of the semiconductor surface to prevent digital circuitry from residing around all sides of the analog circuitry on the semiconductor surface. Moreover, in order to further provide some degree of isolation between the digital and analog circuitry, digital signal lines are often designed so as to not to "pass over" the analog circuitry. That is, recalling that multiple vertical layers are made available for the routing of wires between transistors, often, digital signal wires are designed so as not to pass over a region of a semiconductor surface where analog circuitry resides.

As a consequence, much of the higher levels where wires could potentially be routed are left empty. FIG. 1 shows an exemplary illustration 100. According to FIG. 1, five wiring layers M1 102a through M5 102e are observed upon a semiconductor surface 101. A region 105 of the semiconductor surface (meted out by lines 105a and 105b) is where the transistors of an analog circuit are located. As such, region 105 and the volumetric space above region 105 can be viewed as an analog region of the IC. Note that only the first two wiring layers M1 102a and M2 102b are used to interconnect the transistors of the analog circuit (as well as provide whatever input(s)/output(s) are needed to/from the analog circuitry).

This is often a circumstance of the analog circuitry having a less aggressive transistor packing density than the digital circuitry and/or the analog partition scheme itself. That is, because analog transistors tend to be more spread out on the semiconductor surface 101 than digital transistors, less vertical jumps are needed by the transistor interconnect wiring; and/or, the partitioning of the analog transistors into "their own" dedicated region 105 largely prevents the implementation of long analog wire runs across a wide expanse of the semiconductor chip that necessitate a vertical jump is wiring level (e.g., due to the intercept with another wire at the same level). It should be understood that the use of two wiring metal layers M1 102a and M2 102b over the expanse of the analog region 105 is only exemplary. That is, in other cases, the wire layers used for the analog circuit's internal signaling may be largely limited to only the first wiring layer M1 102a and/or various protrusions of higher layer wiring may be formed at specific locations giving the analog circuit and uneven wiring topography.

Note that the use of only a few wire layers for analog purposes and the prevention of placing digital wiring over the analog circuit causes a significant 'void' 104 in the useable volumetric space of the semiconductor IC. That is, because the overall wiring structure is constructed with layers of dielectric sandwiched between wire layers having metal lines for wiring, and because dielectric material is used as a default material in those regions of a wiring layer where no wiring metallurgy resides, region 104 is largely filled with dielectric material that acts as an unused filler.

FIGURES

The present invention is illustrated by way of example and not limitation in the figures of the accompanying drawings, in which like references indicate similar elements and in which:

FIG. 2a-1 shows an angled view of a mesh power distribution circuit over an analog circuit;

FIG. 2a-2 shows a top view of the mesh power distribution circuit observed in FIG. 2a-1;

FIG. 2a-3 shows a side view of the mesh power distribution circuit observed in FIG. 2a-1;

FIG. 3 shows a collection of baseline structures for determining whether or not a structure is a capacitive structure;

DETAILED DESCRIPTION

The largely unused region 104 residing above the analog circuitry in a multi-wiring level manufacturing process can be used, in many different ways and according to many different structures, toward useful power distribution circuits that not only provide power and/or reference voltages to the underlying analog circuit but also may be naturally or specially configured to provide suitable decoupling capacitance for the underlying analog circuit. The following description provides a discussion of a multitude of various structures that can be formed within the largely unused region (e.g., region 104) that exists above an analog circuit. The following discussion is divided into three principle parts: 1) mesh structures for power distribution circuits residing above analog circuitry; 2) other capacitive structures and their integration into power distribution circuits residing above analog circuitry; and, 3) design flow for designing a power distribution circuit above an analog circuit.

Figure 1:
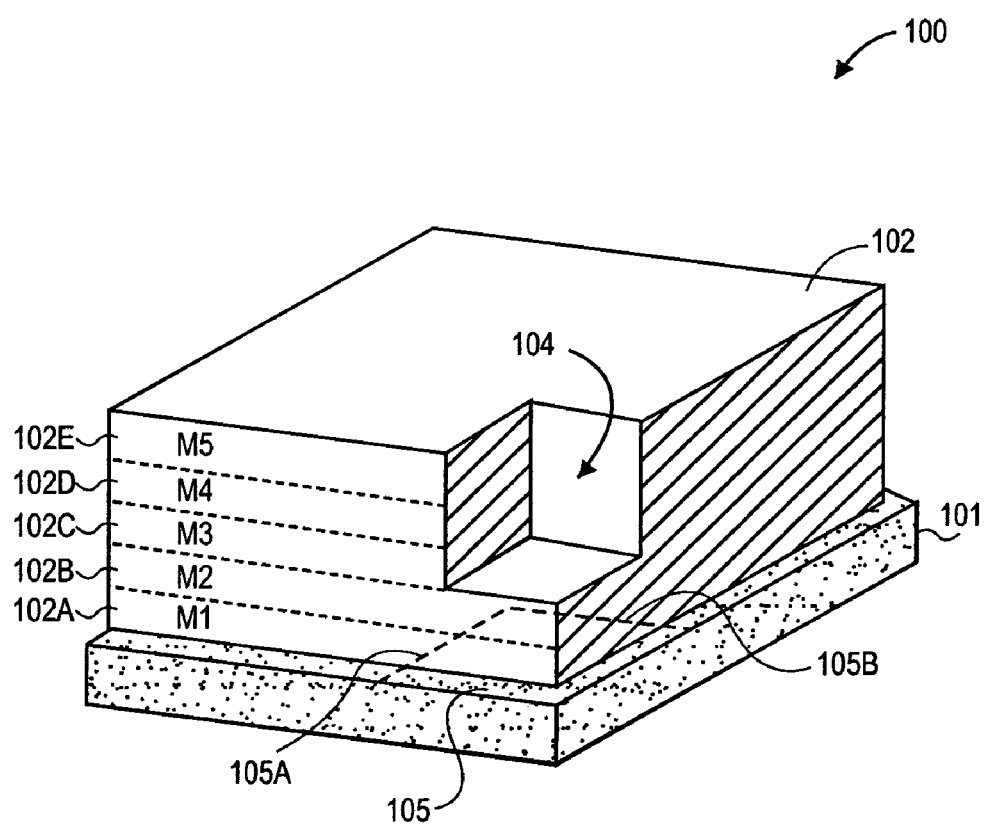
FIG. 1 is an exemplary depiction of an IC having a region dedicated to analog circuitry.
Figures 2, 2A:
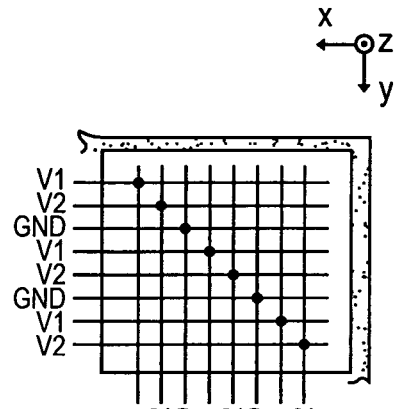

1.0 Mesh Structures for Power Distribution Circuits Residing Above Analog Circuitry A mesh structure is a multi-level organization of multiple wires per level that: 1) exhibit, along a same level, a plurality of commonly designed neighboring wires (e.g., in terms of direction)—typically in such a manner that multiple wires are used at a single level to provide a single supply voltage or reference voltage; and, 2) for those wires providing a same supply voltage or reference voltage, are electrically connected through multiple levels. FIG. 2a-1 shows a depiction of a mesh structure residing above an analog circuit. Note that the analog circuit is deemed to include the signaling wires that interconnect the analog circuit's constituent transistors.

For simplicity the depiction of FIG. 2a-1, like the depiction of FIG. 1, provides an example in which the signaling wires of the analog circuit run throughout but are no higher than the first and second levels of wiring layers M1 202a and M2 202b. As such, the analog circuit is deemed to include the semiconductor substrate 201 and the first two levels of wiring layers M1 202a and M2 202b. Above the analog circuit (i.e., above the second level of signaling wire metal M2 202b in the exemplary depiction of FIG. 2), a mesh structure is observed. The mesh structure observed in FIG. 2 includes: 1) a first plurality of wires 206 all running along the y axis at the M3 signaling wire level; 2) a second plurality of wires 207 all running along the x axis at the M4 signaling wire level; and 3) a third plurality of wires 208 all running along the y axis at the M5 signaling wire level. The wires of the mesh structure are used by the analog circuit to provide power supply (or simply "supply") and/or fixed reference voltages.

A substantial amount of supply current is frequently associated with a supply voltage. In cases where a fixed reference voltage has a substantial amount of associated current, the fixed reference voltage can also be viewed as a power supply voltage. In typical mixed signal or "largely digital" ICs there often exists at least two analog circuit supply lines (e.g., Vda and Vsa), possibly one or more analog circuit reference lines (e.g., Vra), and generaly two digital circuit supply lines (e.g., Vdd and Vsd).

In various embodiments, the plurality of wires in a mesh level may be organized as to the manner in which they provide the analog circuit's specific reference and supply voltages. That is, for example, the plurality of wires associated with each level may be designed to provide the analog circuit's supply and reference voltages in a repetitive fashion. For example, referring to FIG. 2, assuming the analog circuit uses a first supply line (e.g., V1), a second supply line (e.g., V2) and a ground reference line (GND), note that the plurality of wires are organized according to a V1, V2, GND, V1, V2, GND, . . . repeating scheme.

The supply and reference voltages used by the analog circuit are successfully carried through the mesh structure by way of vias that are placed between wires of the same voltage type that reside on different levels. In various embodiments, vias are dropped wherever possible. For illustrational simplicity, only few such vias are shown in FIG. 2a-1. For example, vias 209 and 210 connect "V1" wires from the M5 and M4 levels and the M4 and M3 levels, respectively. Similarly, vias 211 and 212 connect "V2" wires from the M5 and M4 levels and the M4 and M3 levels, respectively; and, vias 213 and 214 connect GND wires from the M5 and M4 levels and the M4 and M3 levels, respectively. The analog circuit's appropriate power and reference lines of the mesh are physically connected to the analog circuit through vias and/or contacts. For example, multiple vias or contacts may be dropped from any of the "V1" wires that reside at the M3 level 206 onto a wire or contact region within the analog circuit that is designed to be pegged to the V1 voltage supply.

Likewise, multiple vias or contacts may be dropped from any of the "V2" wires that reside at the M3 level 206 onto a wire or contact region within the analog circuit that is designed to be tied to the V2 supply line; and, multiple vias or contacts may be dropped from any of the "GND" wires that reside at the M3 level 206 onto a wire or contact region within the analog circuit that is designed to be tied to the GND reference line. A favorable feature of the mesh structure is that multiple wires are used to provide a same supply or reference voltage directly above the analog circuit (e.g., at the M3 level 206 as seen in FIG. 2a-1). As a consequence, multiple instances are likely to arise where a mesh wire resides directly above an analog circuit wire or contact location that is designed to be tied at a same supply or reference line. Each instance corresponds to an opportunity for the mesh to provide supply/reference voltages to the analog circuit.

Certain favorable characteristics are involved in the delivery of supply and/or reference voltages to the analog circuit that the mesh structure naturally lends itself to. A first characteristic is low series resistance. A second characteristic is high decoupling capacitance. Low series resistance is beneficial because a large supply or reference current may be delivered to/from an analog circuit along with its corresponding designed for supply or reference voltage. For example, if the series resistance of the wiring that is used to deliver a supply voltage and current to an analog circuit is too resistive, the combination of a large current through the wiring and the high resistance may cause a significant "IR" voltage drop across the wiring that ultimately results in the analog circuit receiving noticeably less supply voltage that it was ideally designed to receive.

High decoupling capacitance is beneficial because it substantially prevents the voltage between a pair of supply or reference lines from drifting, spiking or otherwise departing from their "designed for" voltage difference. For example, if a pair of supply lines are to maintain a 1.8 volt difference and are coupled by a weak decoupling capacitance—there exists an increased likelihood that that the "designed for" 1.8V difference between the supply lines may not be adequately maintained (e.g., the voltage difference might grow to 2.0V or drop to 1.6V). As the basis of proper operation for many analog circuits is that voltage difference between certain supply and/or reference lines be maintained (albeit with some tolerance), weak decoupling capacitance in many cases risks improper analog circuit operation.

The mesh structure lends itself to each of these characteristics. With respect to the low series resistance, multiple wires and wiring paths for a same supply or reference voltage corresponds to multiple "parallel" circuits. As parallel circuitry causes the reduction of series resistance, the resistance of the wires from which the mesh is constructed is effectively reduced by the multiple parallel current paths that the same wires help to form. With respect to the decoupling capacitance, the capacitance between wires is increased as the spacing between them decreases. Because the mesh may be constructed with large numbers of closely spaced wires (both vertically and horizontally), the mesh provides multiple instances of high decoupling capacitance between its constituent metal wires. As such, the supply and/or reference voltages that are transported by the mesh should possess high decoupling capacitance amongst one another; and, likewise, the "designed for" voltage differences amongst them should remain acceptably stable.

Figures 2, 2A, 3:
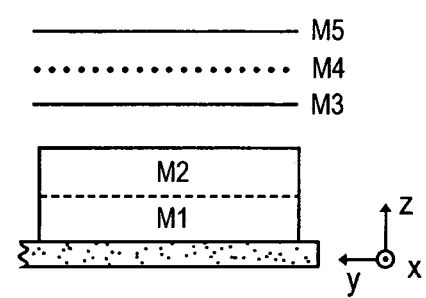
Figures 1, 2A:
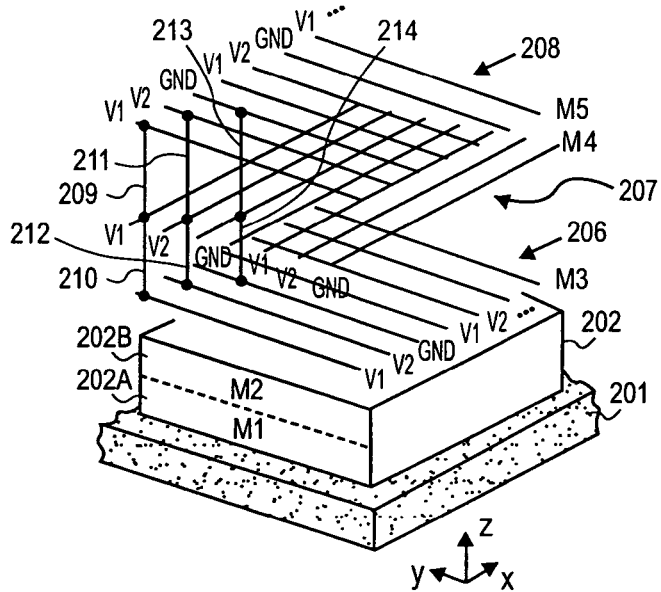

FIG. 2a-2 shows a top view of the mesh structure of FIG. 2a-1. FIG. 2a-3 shows a side view of the mesh structure of FIG. 2a-1. Note that even though the mesh structure of FIG. 2a-1 is only drawn up to the M5 wiring level, the mesh structure may be designed to extend further up the z axis so as to include even higher wiring levels. The orthogonal arrangement of differing wiring directions of the mesh structure of FIGE. 2a-1,2,3 may be referred to as a "Manhattan" arrangement. As such the mesh structure of FIGS. 2a-1,2,3 may be referred to as a "manhattan" mesh structure.

Figure 2B:
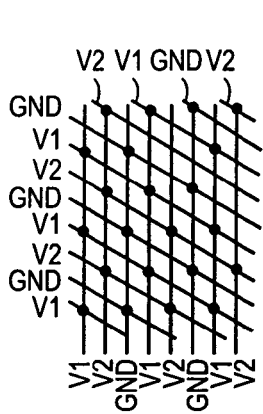
FIG. 2b shows a top view of an angled mesh power distribution circuit over an analog circuit.

FIG. 2b, by contrast, shows a top view of a mesh structure having an angled rather than orthogonal arrangement. Mesh structures designed according to angled arrangements may be likewise referred to as "angled" mesh structures.

2.0 Other Capacitive Structures and their Integration into Power Distribution Circuits Residing Above Analog Circuitry 2.1. Capacitive Structures Two non electrically connected conductors separated by a dielectric form a capacitor. The pair of non connected conductors of a capacitor are typically referred to as the electrodes of the capacitor. Whenever a voltage is placed across the electrodes of a capacitor, electric field flux lines are established between the electrodes. Generally, the greater the amount of electric field flux lines, the greater the capacitance of the capacitor. A capacitive structure is any capacitor whose electrodes are designed to enhance the electric field flux between the electrodes beyond that which could be achieved with closely neighboring, parallel wires (manufactured by the applicable manufacturing process) that run directly to their destination, save for their avoidance of obstacles, and where the number of neighboring, parallel wires is not excessive for the supply voltages, reference voltages, and/or signals to be carried to their destination and their corresponding current draw.

Here, running multiple metal lines closely "next to" or "near" one another directly to their destination will exhibit a natural capacitance. However, such runs of multiple metal lines directly to their destination would be used mostly for the benefit of delivering their corresponding supply voltages, references and/or signals to their destination with little or no regard to the capacitance that exists between them. Deliberate attempts to enhance the capacitance beyond that achieved with a direct run of neighboring parallel wires, however, corresponds to the formation of a capacitive structure because the designer's eye is directed toward the enhancement of the resulting capacitance.

Various depictions of neighboring, parallel wires that are run directly to their destination are shown in FIG. 3 for various sets of destination location and obstacle(s). Therefore, the structures of FIG. 3 correspond to a collection of possible "benchmark" structures against which other structures could be compared for a similar environment (i.e., combination of destination, set of obstacles, non excessive wire count based on the supplies/references/signals to be transported, manufacturing process). Those structures exhibiting more capacitance than the corresponding environment's applicable benchmark are to be deemed "capacitive structures". It should be noted that benchmark structures differing from the exemplary collection observed in FIG. 3 should be readily discernable for different environments.

Features that may be found in a capacitive structure include: 1) expanded electrode surface area, as compared to pairs of neighboring parallel wires, so as to increase the number of electric field flux lines; and/or, 2) a dielectric material between the electrodes having a higher permitivity that which is standard for a neighboring pair of parallel wires manufactured by the applicable manufacturing process.

To first order note that mesh structures as described in the preceding section can be viewed as capacitive structures. Here, even though a mesh structure may be constructed with a plane of neighboring, parallel wires, the emphasis on creating multiple planes so as to create a three dimensional structure enhances the electrode surface area so as to increase the electric field flux that exists between electrode wires. Moreover, again to increase the number of electric flux lines that exist between wires, mesh structures typically posses a degree of aimlessness with respect to the destination(s) that exist. That is, for example, the planar reaches of a mesh structure tend to expand over semiconductor surface area well beyond those locations where a particular contact is dropped into the analog circuit. Said another way, to increase the number of flux lines, excessive numbers of parallel wires are often used at various mesh levels.

FIGS. 4a through 4h provide some more examples of capacitive structures. It is important to emphasize that a wealth of other capacitive structures beyond the mesh structure and those presented in FIGS. 4a through 4h may also be constructed. The capacitive structures presented in FIGS. 4b through 4h are also presented in Aparicio and Hajimiri, "Capacity Limits and Matching Properties of Integrated Capacitors" IEEE Journal Of Solid-State Circuits, Vol. 37, No. 3 Mar. 2002.

Figure 4A:
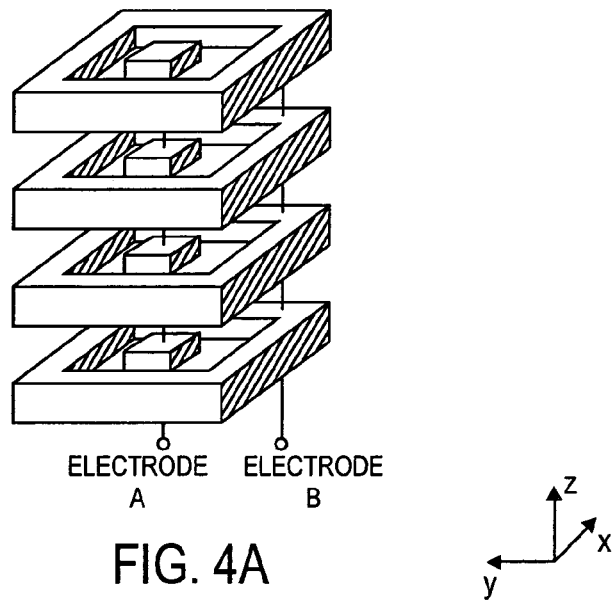
FIG. 4a shows an embodiment of a boxed capacitive structure that can be integrated into a power distribution circuit over an analog circuit.

FIG. 4a provides a depiction of a "boxed" capacitive structure. The boxed capacitive structure is coaxial in nature and is formed by stacking metal wire segments upon on another so as to surround a block of shorter wire segments. For simplicity, interconnecting vias are not drawn but their use is suggested by the electrode pair wiring. Because metal wire segments are stacked on top of one another, the surface area (lying mostly in both the xz and yz planes) of the electrodes where the electric field flux lines may emanate/terminate is expanded beyond that of a non excessive amount of neighboring parallel wires.

Figure 4B:
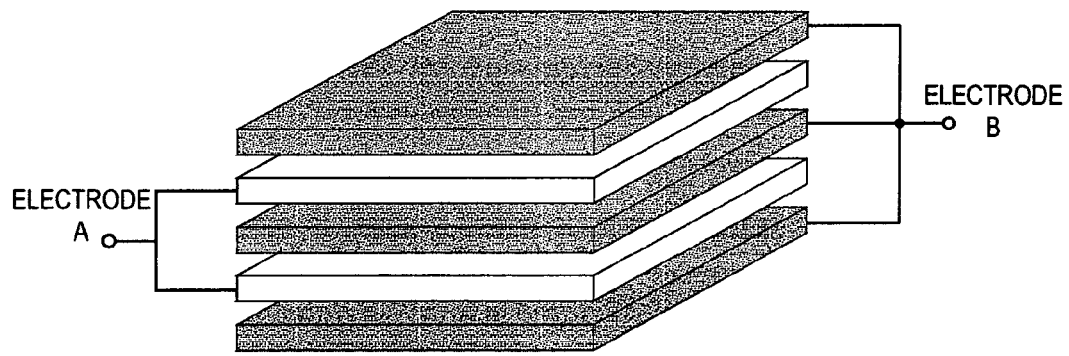
FIG. 4b shows an embodiment of a parallel plate capacitive structure that can be integrated into a power distribution circuit over an analog circuit.

FIG. 4b shows an embodiment of a parallel plates capacitive structure. The parallel plates capacitive structure is formed with horizontal slabs that are vertically overlapping. For simplicity, interconnecting vias are not drawn but their use is suggested by the electrode pair wiring. Because, wide surface area slabs face each other, the surface area of the electrodes where the electric field flux lines may emanate/terminate is expanded beyond that of a non excessive amount of neighboring parallel wires.

Figure 4C:
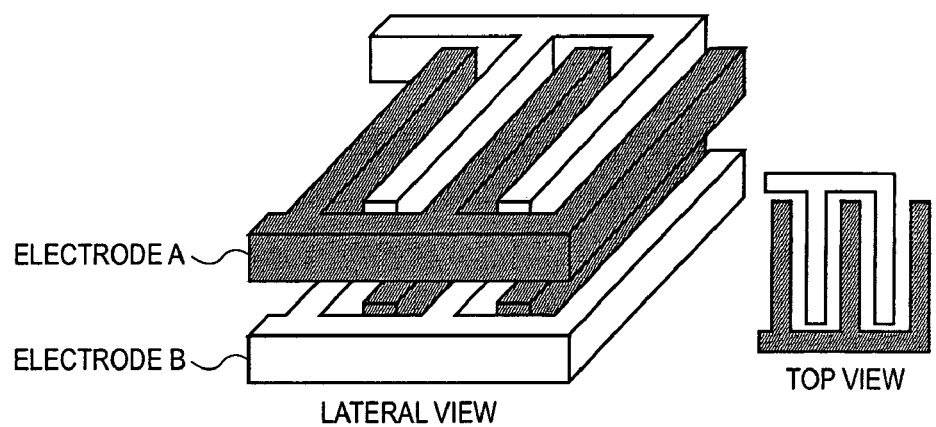
FIG. 4c shows an embodiment of a parallel wires capacitive structure that can be integrated into a power distribution circuit over an analog circuit.

FIG. 4c shows an embodiment of a parallel wires capacitive structure. For simplicity, interconnecting vias are not drawn but their use is suggested by the electrode pair wiring. A neighboring pair of parallel wires from a parallel wires capacitive structure uses protruding interlaced fingers to effectively increase the surface area (lying mostly in the xz plane) of the electrodes where the electric field flux lines may emanate/terminate beyond that of a non excessive amount of neighboring parallel wires.

Figure 4D:
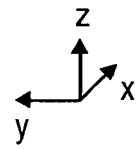
FIG. 4d shows an embodiment of a vertical parallel plates capacitive structure that can be integrated into a power distribution circuit over an analog circuit.
Figure 4D:
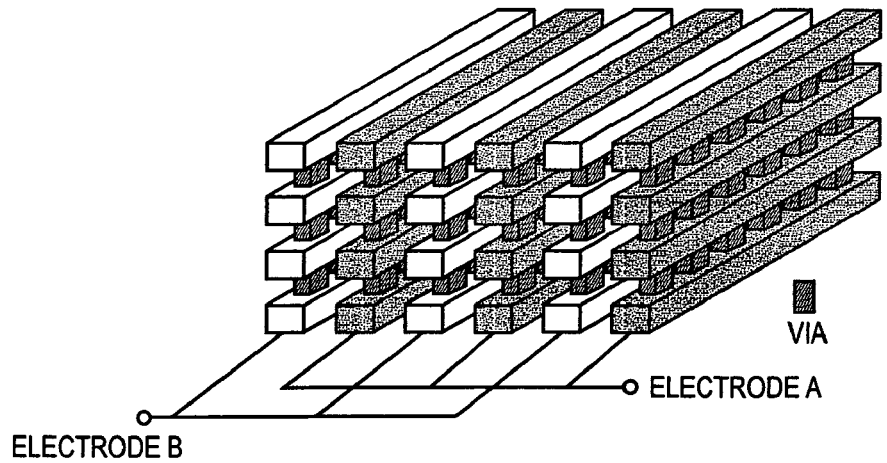

FIG. 4d shows an embodiment of a vertical parallel plates capacitive structure. The vertical parallel plates capacitive structure is formed with a pair of stacked metal line structures. Again, because metal lines are stacked on top of one another, the surface area (lying in the xz plane) of the electrodes where the electric field flux lines may emanate/terminate is expanded beyond that of a non excessive amount of neighboring parallel wires.

Figure 4E:
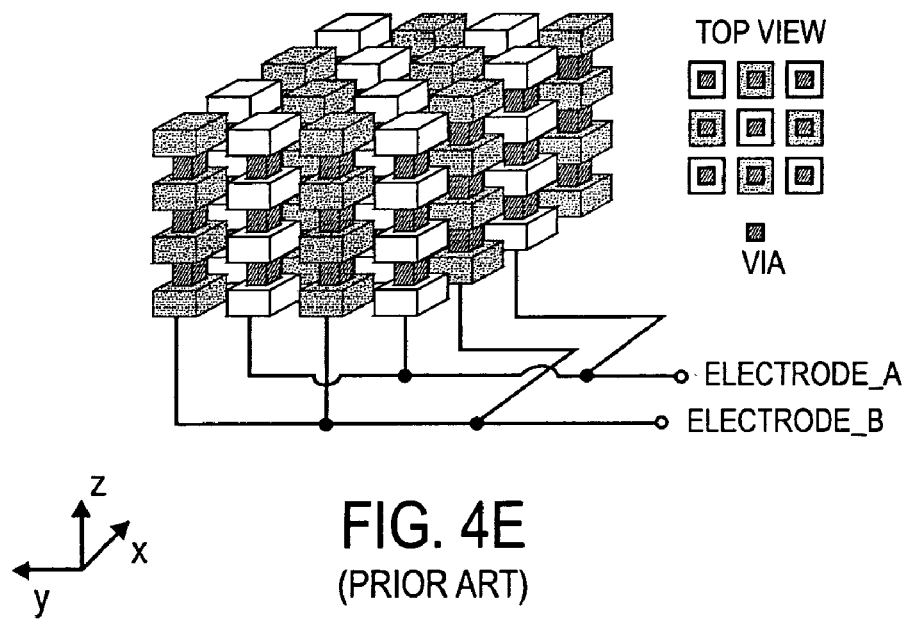
FIG. 4e shows an embodiment of a vertical bars capacitive structure that can be integrated into a power distribution circuit over an analog circuit.

FIG. 4e shows an embodiment of a vertical bars capacitive structure. The vertical bars cause electric field flux lines to radiate/terminate in/from each bar face; which, in turn, corresponds to an expansion of the electric field flux lines beyond that formed with a non excessive amount of neighboring parallel wires.

Figure 4F:
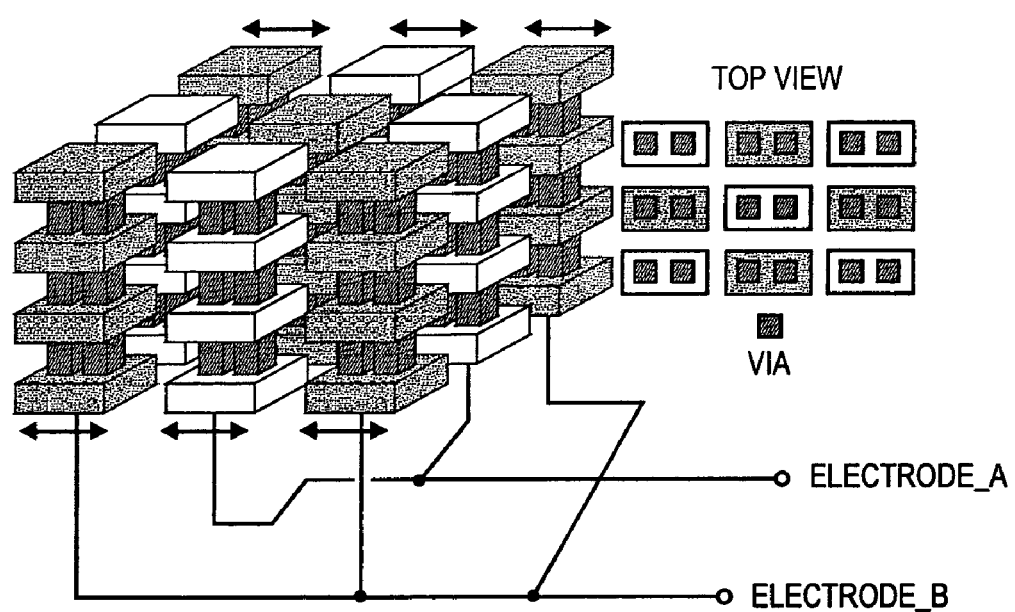
FIG. 4f shows an embodiment of a modified vertical bars capacitive structure that can be integrated into a power distribution circuit over an analog circuit.

FIG. 4f shows an embodiment of a modified vertical bars capacitive structure. The modified vertical bars capacitive structure is the same as the vertical bars capacitive structure only that rectangular bars are employed instead of square bars. As such, the vertical bars cause electric field flux lines to radiate/terminate in/from each bar face; which, in turn, corresponds to an expansion of the electric field flux lines beyond that formed with a non excessive amount of neighboring parallel wires.

Figure 4G:
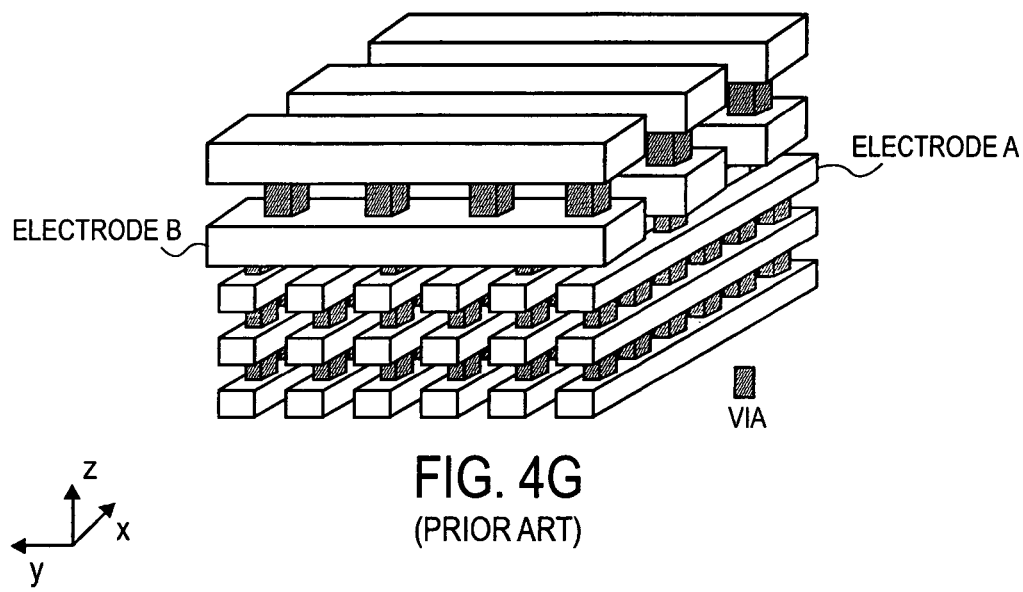
FIG. 4g shows an embodiment of a modified parallel plates capacitive structure that can be integrated into a power distribution circuit over an analog circuit.

FIG. 4g shows an embodiment of a modified vertical parallel plates capacitor structure. The modified vertical parallel plates capacitive structure is the same basic vertical parallel plates capacitive structure observed in FIG. 4d albeit with wires placed orthogonal to one another so that a first vertical capacitor is formed along a first direction and a second vertical capacitor is formed along a second direction. As such, because metal lines are stacked on top of one another, the surface area (lying in the xz plane) of the electrodes where the electric field flux lines may emanate/terminate is expanded beyond that of a non excessive amount of neighboring parallel wires.

Figure 4H:
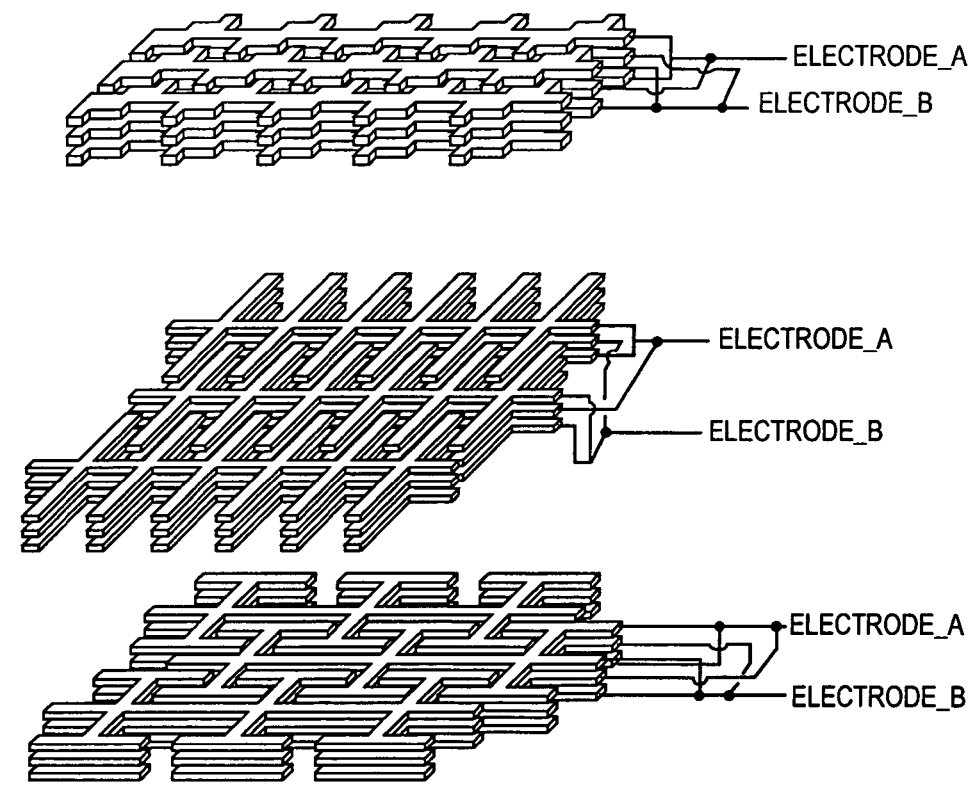
FIG. 4h shows three different embodiments of a quasifractal capacitive structure that can be integrated into a power distribution circuit over an analog circuit.

FIG. 4h shows three different embodiments of quasifractal capacitor structures. The quasifractal capacitor structures are three dimensional variations of the basic parallel wires capacitive structure originally shown in FIG. 4c. Likewise, the protruding interlaced fingers effectively increase the surface area of the electrodes where the electric field flux lines may emanate/terminate beyond that of a non excessive amount of neighboring parallel wires.

2.2 Integration of Capacitive Structures into Power Distribution Circuits

As already described in Section 1.0, mesh structures may be configured to provide supply and reference voltages and their corresponding currents to an underlying analog circuit. Since mesh structures may also be regarded as capacitive structures, the discussion of Section 1.0 may also be viewed as a discussion that describes how a particular capacitive structure (i.e., a mesh structure) can be configured to provide supply and reference voltages and their corresponding currents to an underlying analog circuit. The present discussion attempts to emphasize that any capacitive structure (e.g., such as any of those observed in FIGS. 4a through 4h) can also be tailored to provide supply and reference voltages and their corresponding currents to an underlying analog circuit. Moreover, a power distribution circuit residing over an analog circuit may be formed with a plurality of different types of capacitive structures. Further still, different types of capacitive structures may be mixed together as appropriate so as to form a more complex power distribution circuit network. Some basic examples are provided below.

Generally, mesh structures are particularly useful because they can drop a via or contact from a wealth of different locations along a single plane and exhibit good decoupling capacitance. Other capacitive structures might exhibit higher capacitance than a mesh structure. As such, in a design environment where multiple contacts to the underlying analog circuit are appropriate but higher decoupling capacitance than is achievable with a mesh structure is desirable, it may be useful to intermix in a single power distribution circuit, a mesh structure and a higher capacitance capacitive structure.

Figure 5:
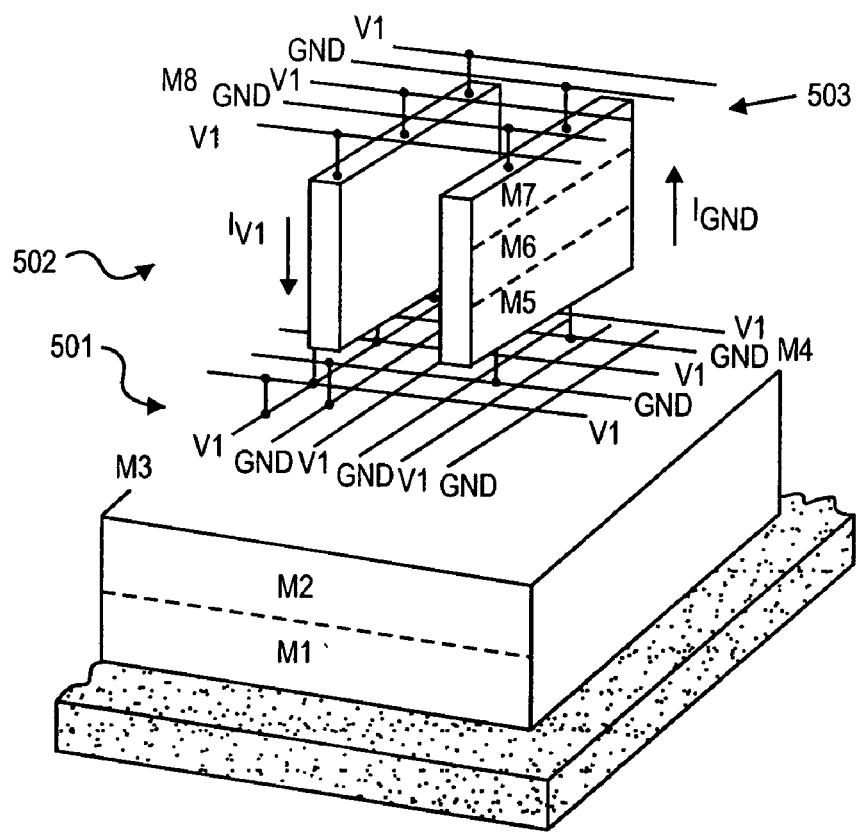
FIG. 5 shows an embodiment of a vertical parallel plates capacitive structure integrated with a mesh to form a power distribution circuit over an analog circuit.

FIG. 5 shows an embodiment of possible power distribution circuit tailored accordingly. According to the power distribution circuit of FIG. 5, a mesh structure 501 is implemented directly above the analog circuit with the M3 and M4 signal wire layers (for illustrational simplicity no contacts from the mesh structure to the analog circuit are shown). A simple vertical parallel plates capacitive structure 502 (assuming it possesses higher decoupling capacitance than the mesh just for the sake of example) is formed directly above the mesh structure from the M5 through M7 wire layers. For simplicity its vias are not drawn. A run of parallel wires 503 are positioned above the simple vertical parallel plates capacitive structure at the M8 wire layer. The power distribution circuit is simplistic in terms of the number of different voltage nodes that it implements. That is, only a single supply voltage ("V1") and only a single reference voltage ("GND") are distributed through the power distribution circuit to the underlying analog circuit.

Recalling the discussion of IR drops with respect to the mesh structure in Section 1.0, note that not only should the mesh structure 501 of FIG. 5 posses significantly low series resistance but also the simple vertical parallel plates capacitor structure 502 should be designed so as to posses significantly low series resistance. Here, in the particular instance of FIG. 5, note that "all" of the analog circuit's V1 supply and GND reference currents will flow directly through the simple vertical parallel plates capacitor structure 502. Because a potentially substantial amount of current is to flow through the single simple vertical parallel plates capacitor structure 502, considerations must be taken to ensure that the series resistance of the simple vertical parallel plates capacitor's plates are low enough so as not to cause a substantial IR drop across them. Small series resistance is generally achieved by ensuring that the area of the plates perpendicular to the direction of current flow (i.e., the area of the plates in the xy plane) are sufficiently large.

Moreover, again because substantial amounts of current might flow through the plates of the simple vertical parallel plates capacitor 502, electro migration (EM) should be considered. Electro migration is the movement of a conductor in response to a high current density flowing through the conductor; and, if left unaccounted for, can cause reliability problems. Similar to keeping a low series resistance, EM considerations can be properly accounted for by keeping the current density beneath a certain threshold; which, in turn, is accomplished by ensuring a wide enough plate area perpendicular to the direction of current flow. Similarly the width of the mesh structures wires should be large enough to ensure EM is not a concern. Running all or at least substantial amounts of analog circuit supply/reference currents through capacitive structures (such as structures 501, 502 as demonstrated in FIG. 5) is believed to be novel and, therefore, applying IR drop and EM concerns to capacitive structures so that power/reference voltage and currents can be properly supplied to an underlying analog circuit is also believed to be a novel design process. Note also the amount of current flowing through the simple vertical parallel plates capacitor structure 502 can be reduced by adding additional capacitor structures that neighboring the shown capacitor structure.

Figure 6:
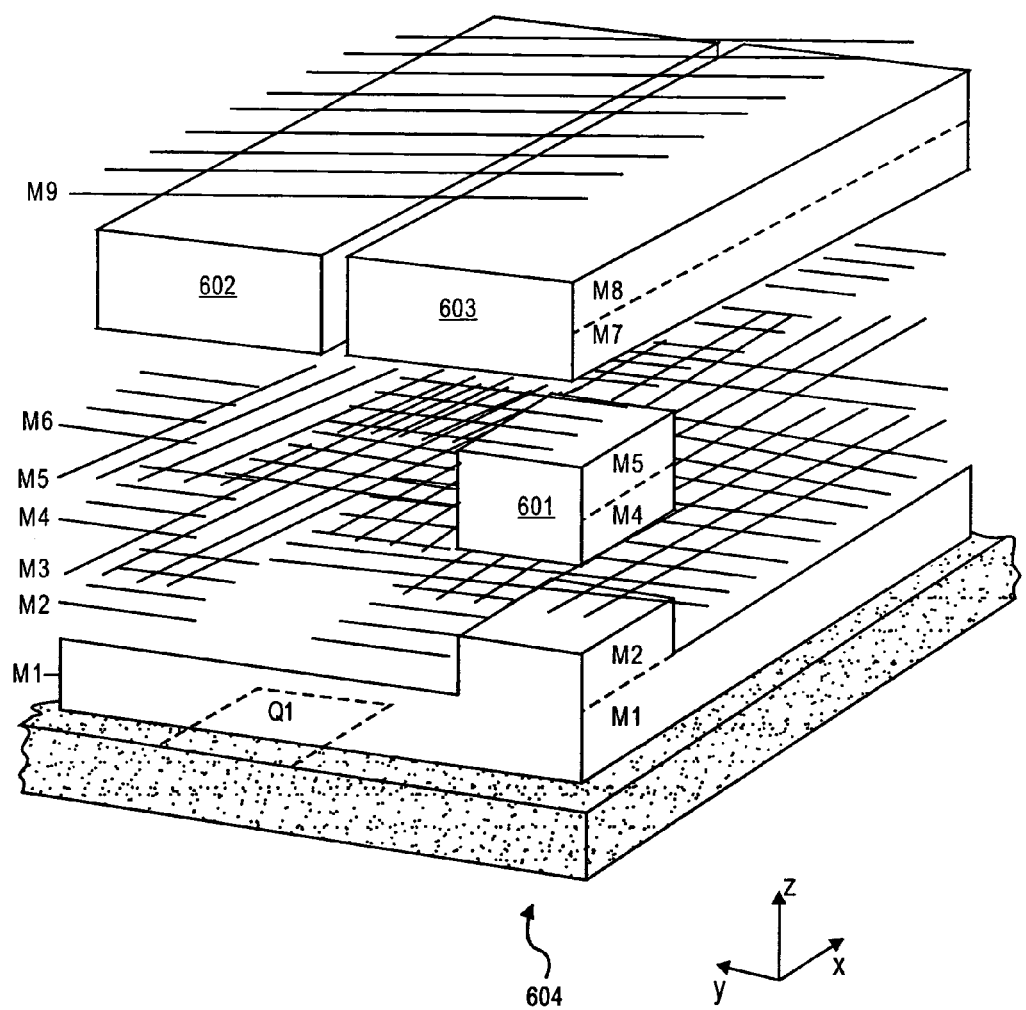
FIG. 6 shows an embodiment of power distribution circuit including both mesh and any other capacitive structure over an analog circuit.

FIG. 6 elaborates on the versatility with respect to possible structural designs that may be used to form a power distribution circuit in the heretofore mostly unused space residing above an analog circuit. For illustrative convenience vias and contacts are not shown. FIG. 6 also demonstrates some additional concerns that may arise besides IR drop and EM. The embodiment of FIG. 6 illustrates a mostly mesh structure from the M2 to M6 levels. However, levels M4 and M5 also contain a capacitive structure 601 other than a mesh structure (e.g., any of the structures observed in FIGS. 4a through 4h). Thus, the M4 and M5 levels contain two different types of capacitive structures: mesh and non-mesh. Levels M7 and M8 contain a pair of capacitive structures 602, 603 each of which are different than a mesh. More over, the pair of capacitive structures 602, 603 may be of a different type (e.g., the first capacitive structure 602 at the M7 and M8 levels is a vertical parallel plates capacitive structure; and, the second capacitive structure 603 at the M7 and M8 levels is a parallel plates capacitive structure).

It should be noted again that each of the different supply lines in the mesh structure tend to exhibit strong capacitance amongst themselves. However, depending on the circumstances, capacitance can be either or both a blessing and a curse. For example, as already discussed, strong capacitance between a pair of supply lines is beneficial because their voltage difference will be strongly maintained (at least for those circuits that depend upon the difference being maintained). However, large capacitance also permits "noise" to travel freely. That is, the behavior of capacitance with respect to noise is akin to a short circuit. Thus, for two supply lines having strong capacitance between them, noise induced upon the first line will simply "pass through" the capacitance and present itself upon the second line. Analog circuits tend to be sensitive to noise; and, as such, presentation of a single "noisy" line to a mesh could cause all the voltages provided by the mesh to be "noisy"; which, in turn, can result in poor analog circuit performance.

In many situations digital supply lines, because of their noisiness, should be kept out of a mesh structure having one or more analog supply and/or reference lines. Even so, if digital supply lines are needed by the analog circuit (e.g., in the case of Analog-to-Digital (A/D) Converter circuits (ADCs) or Digital-to-Analog (D/A) Converter circuits (DACs), a structure such as that suggested with respect to capacitive structures 602, 603 of FIG. 6 may be useful. That is, strong decoupling capacitance can be formed for digital supplies and/or digital references within a first capacitive structure such as capacitive structure 602; and, strong decoupling capacitance can be formed for analog supplies and/or analog references within a second capacitive structure such as capacitive structure 603. Here, in this case, the underlying mesh structure could be removed, and the pair of structures 603, 603 could be dropped down until just above the analog circuit. By keeping the structures 602, 603 far enough away from each other the capacitance between them would be reduced; which, in turn, would substantially impede the propagation of noise from the digital capacitive structure (e.g., 602) to the analog capacitive structure (e.g., 603). As such, the formation of intentionally separated capacitive structures is useful for providing strong decoupling capacitance where beneficial (e.g., voltage difference stability) yet avoiding "coupling" capacitance where harmful (e.g., coupled noise). Note that the pair of capacitive structures 602, 603 could be mesh structures.

Thus, continuing with the original discussion of the embodiment of FIG. 6, the M7 and M8 capacitive structures 602, 603 may be used, for example, to provide significant decoupling capacitance for two different pairs of voltages (e.g., structure 602 may be used to decouple a V1, V2 voltage pair and structure 603 may be used to decouple a V3, V4 voltage pair) who nevertheless should be isolated from another with weak capacitance between them. Since significant currents may flow through both of structures 602, 603 (e.g., because all supply current from V1 flows through structure 602 and all supply current from V3 flows through structure 603) extra attention should be given to the dimensions of their metallurgy so that their corresponding IR drop and EM exposures are insignificant. Once substantial noise filtering is achieved through structures 602, 603, the mesh structure is largely utilized to bring the appropriate supply and references to the underlying analog circuit.

Again, the widths of the mesh structure's wiring should be designed to ensure that their IR drop and EM exposures are insignificant. A notable change in capacitive structure type appears at the foremost corner of levels M4 and M5. Here, some "extra" capacitance is added through the introduction of non mesh structure 601. Extra capacitance may be used to locally enhance the decoupling capacitance directed toward a particular region of the analog circuit. For example, if the foremost corner 604 of the analog circuit contains circuitry that is especially sensitive to changes in the voltage between the supply lines, a capacitive structure 601 having greater capacitance per unit volume than a mesh (e.g., for the sake of example) may be used to even further strengthen the stability of the voltage difference. Note that the electrodes of such a capacitive structure can, if desired, be designed so as not to transport substantial supply currents.

Note also that the surface topography of the analog circuit is uneven. That is, the interconnect wiring for the entire analog circuit can be routed through only the M1 layer—with the exception of the foremost corner 604 which needs to use the M2 layer. Because of this uneven nature of the analog circuit's topography, the M2 layer of the mesh needs to be "blocked out" at the foremost corner 604. That is, viewing a layer of mesh structure as the default structure to be constructed at the M2 layer, the design of the power distribution circuit of FIG. 6 requires an understanding that the M2 mesh layer is not to be constructed at the foremost corner because signal wiring for the underlying analog circuit is present at that location.

Moreover, another technique for purifying the signal processing performed by an analog circuit involves the blocking out of mesh or other capacitive structures near a "sensitive" transistor or circuit. Here, as any wire can be viewed as a potential noise source, some circuit designers may choose to keep the power distribution circuit (or just a portion thereof) away from a transistor or circuit region that is particularly sensitive to coupled noise (e.g., the input nodes of an amplifier). Referring to FIG. 6, note that the mesh structure has been completely blocked out from layers M2 through M6 above a territory meted out be dotted lines surrounding transistor "Q1". In this case, transistor Q1 may be deemed to be a particularly noise sensitive transistor; and, in response to this consideration, the mesh structure has been completely blocked out through the M6 layer above the indicated region surrounding the Q1 transistor. In a more relaxed design approach, only certain mesh wires are allowed to pass over the Q1 transistor (i.e., only certain wires are blocked).

Figure 7:
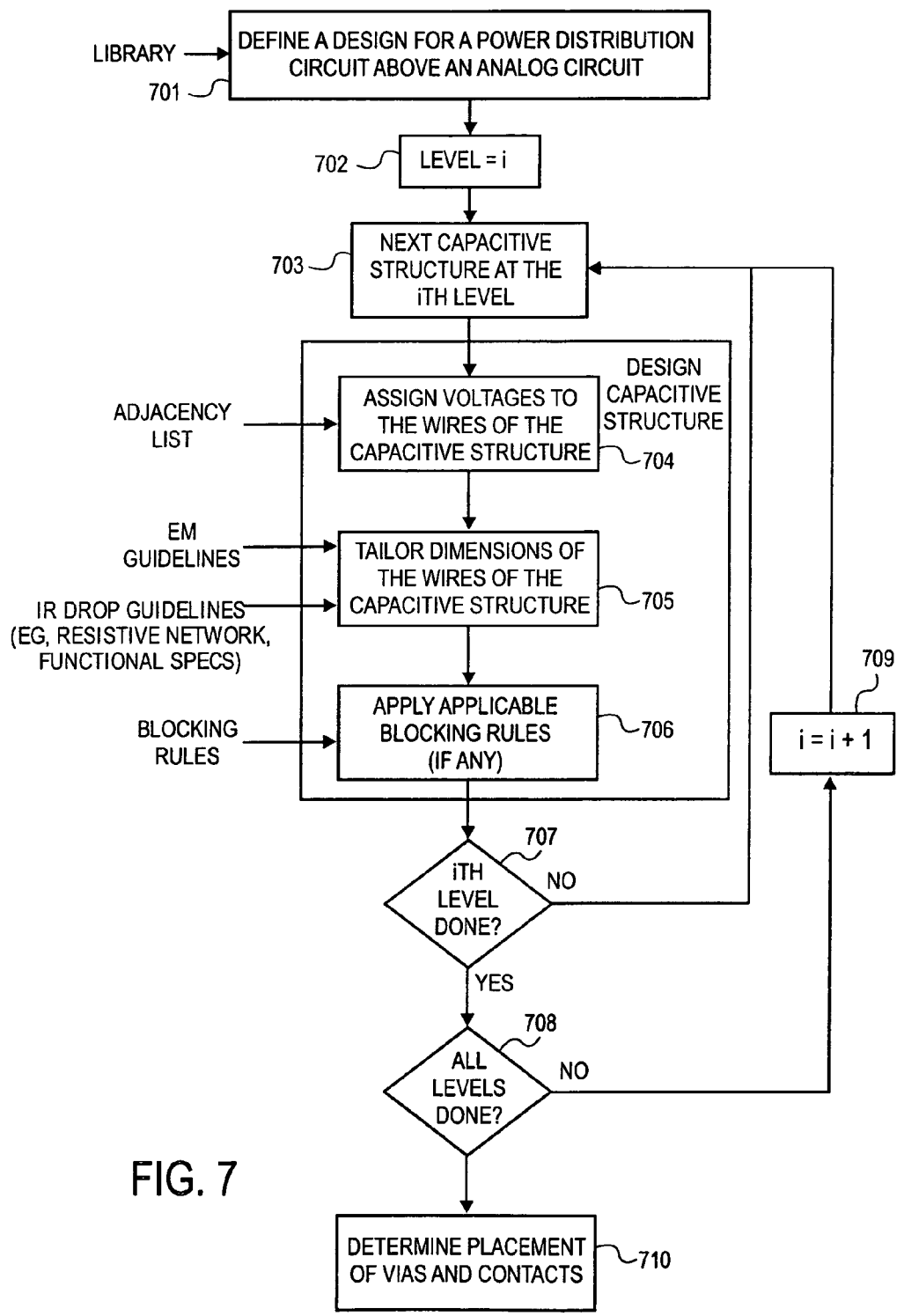
FIG. 7 shows an embodiment of a methodology for designing a power distribution circuit over an analog circuit.

3) Design Flow for Designing a Power Distribution Circuit Above an Analog Circuit With these design considerations in mind (capacitive structure number and type per level; IR drop per capacitive structure; EM analysis per capacitive structure; blockage per level, etc.), FIG. 7 shows an embodiment of a design process that may be utilized by a software based automated design tool to construct designs for power distribution circuits in the heretofore mostly unused space that exists above an analog circuit. It is believed that a software environment lends itself well toward providing a designer with the ability to implement any of a wide number of custom tailored power distribution circuits. According to the methodology of FIG. 7, a design for a power distribution circuit is first defined 701.

In an embodiment a defined design for a power distribution circuit includes, for each signal wire level, the identification and location of each type of capacitive structure that is implemented at the signal wire level. For example, some form of definition that identifies the location of the mesh structure and the non mesh capacitive structures 601, 602, 603 observed in FIG. 6 is an example of how the design of the power distribution circuit of FIG. 6 might be defined. The defined design may also include a description of the appropriate blocking rules (e.g., no wires over Q1; only analog wires over Q1; no wires over foremost corner, etc.) as well as an corresponding circuit description of the power distribution circuit (e.g., as a circuit of resistances) for the purposes of calculating IR drops through the power distribution circuit. In various embodiments, a GUI may be presented to a user that allows the user to visually select and place various capacitive structures for the purpose of defining the design. Here, a library of different capacitive structure types may be used to not only call up a visual representation of a selected capacitive structure but to also call up a file that is particular to the selected capacitive structure and that is used by the underlying software to formally build the design.

Once the design has been defined 701, each capacitive structure for each wire level is more particularly designed. According to the particular embodiment of FIG. 7, wire levels are tracked according to a parameter "i" 702 (e.g., if 6 levels are used to implement the power distribution circuit, i=1,2,3 . . . 6.). Wire levels are designed in succession by configuring particulars of each capacitive structure that is to be designed at a particular level. The embodiment of FIG. 7 shows an iterative process where the capacitive structures for a particular level are sequentially designed 707; then, upon completion of the level, the next level is designed 708, 709. The process continues until all levels are designed, at which point, the placement of vias and contacts are defined 710. Sequences 704, 705 and 706 show a basic design flow for designing the voltage assignment, wiring dimensions and blockage of any particular capacitive structure.

The assignment 704 of voltages to the wires of the capacitive structure involves the identification as to which capacitive structure wire is to carry which supply or reference voltage. Recalling that a file particular to a capacitive structure type might be called from a library, a file for a mesh structure type might cause the software/designer to define the ordered sequence of voltages (e.g., referring to FIGS. 2a-1 through 2a-3, V1, V2, GND, V1, V2, GND . . . , etc.). By contrast, a file for a simple vertical parallel plates capacitor structure might cause the software/designer to define which pair of voltages are to be applied to the structure.

In the former case (the mesh structure), an adjacency list might be used by the software to assist in the definition of the ordered sequence. An adjacency list describes which neighboring pairs of supply and or reference lines are favorable and which neighboring pairs of lines are unfavorable (e.g., those lines needing strong decoupling capacitance and should be carried by neighboring or nearly neighboring wires; those lines not needing strong decoupling capacitance and therefore not needing to be carried by neighboring or nearly neighboring wires). In a further embodiment, the strength of the preference for placing specific pairs or lines next to one another is provided numerically. For example, a number between 1 and 0 is listed for each possible pair where the value of the number depends upon how favorable or unfavorable their neighbored placement is.

The tailoring of the capacitive structure's wiring dimensions 705 involves and understanding of how resistive the capacitive structure is supposed to be or should be. Recalling that a file might be called up from a library for each particular capacitive structure type, in an embodiment, each file includes a resistor circuit model for its corresponding capacitive structure type so that not only can the resistance of the specific capacitive structure be modeled; but also, a resistive circuit model for the entire power distribution circuit can be efficiently constructed (e.g., a resistive network). From the resistive network, current flows through the various legs can be calculated; which, in turn, can be used to calculate how resistive the capacitive structure's wiring is allowed to be based upon IR drop concerns. The functional specs of the packed device and the functional performance of the analog circuit can be used to dictate how much IR drop is permitted. From these considerations, wiring dimensions can be determined. Lastly, if EM guidelines are offended for the applicable manufacturing process, wiring dimensions may be tweaked to be even wider so as to reduce current density.

Applying blocking rules 706 involves specifying, from the defined design 701, that certain portions of a capacitive structure are not be constructed.

Figure 8:
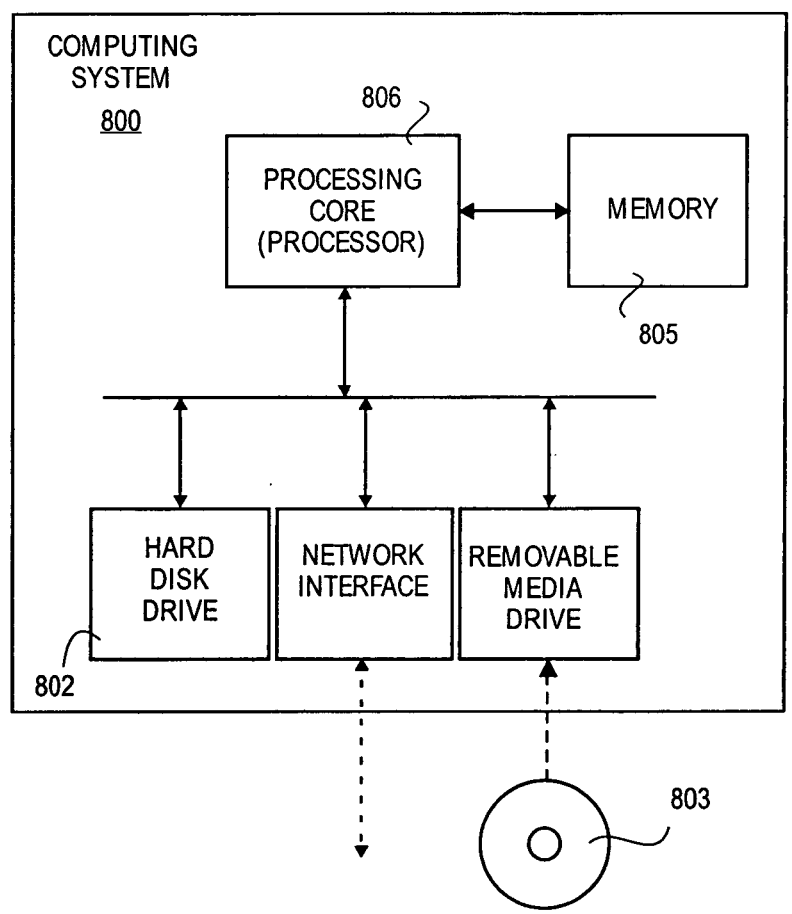
FIG. 8 shows an embodiment of a computing system.

FIG. 8 shows an embodiment of a computing system 800 that can execute instructions residing on a machine readable medium (noting that other (e.g., more elaborate) computing system embodiments are possible). In one embodiment, the machine readable medium may be a fixed medium such as a hard disk drive 802. In other embodiments, the machine readable medium may be movable such as a CD ROM 803, a compact disc, a magnetic tape, etc. The instructions (or portions thereof) that are stored on the machine readable medium are loaded into memory (e.g., a Random Access Memory (RAM)) 805; and, the processing core 806 (e.g. having one or more processors) then executes the instructions. The instructions may also be received through a network interface 807 prior to their being loaded into memory 805.

Note also that design embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behaviorial level description, a register transfer level (RTL) description, a gate level netlist and a transistor level netlist. Machine readable media may also include media having layout information such as a GDS-II file.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A power distribution circuit above an analog circuit, said power distribution circuit built with interconnect wiring of a semiconductor chip integrated circuit that contains said analog circuit, said power distribution circuit comprising a mesh structure that includes:
   a) a first group of metallic wires formed in a first layer, said first group of metallic wires running in a first direction;
   b) a second group of metallic wires formed in a second layer, said second layer above said first layer, said second group of metallic wires running in a second direction that is different than said first direction;
   c) a first electrode of a vertical capacitor comprising a first group of vertically aligned metallic wires each running in a same direction, said first electrode above said first and second layers, said second electrode above said first and second layers;
   d) a second electrode of said vertical capacitor comprising a second group of vertically aligned metallic wires each running in said same direction, said second electrode above said first and second layers.

2. The power distribution circuit of claim 1 wherein said first group of metallic wires effect two electrically isolated conductive regions.

3. The power distribution circuit of claim 2 wherein said second group of metallic wires effect two electrically isolated conductive regions, one of said conductive regions of said second group electrically connected to one of said conductive regions of said first group, the other of said conductive regions of said second group electrically connected to the other of said conductive regions of said first group.

4. The power distribution circuit of claim 3 wherein said one of said conductive regions of said second group is electrically connected to said first electrode, and, the other of said conductive regions of said second group is electrically connected to said second electrode.

5. The power distribution circuit of claim 4 further comprising a third group of metallic wires formed in a third layer, said third layer above said first and second electrodes.

6. The power distribution circuit of claim 1 wherein said first and second directions are orthogonal to one another.

* * * * *